US011994885B2

United States Patent
Li

(10) Patent No.: US 11,994,885 B2
(45) Date of Patent: May 28, 2024

(54) DIFFERENTIAL PRESSURE LIQUID FLOW CONTROLLER

(71) Applicant: TSI Incorporated, Shoreview, MN (US)

(72) Inventor: Lin Li, Arden Hills, MN (US)

(73) Assignee: TSI Incorporated, Shoreview, MN (US)

( * ) Notice: Subject to any disclaimer, the term of this patent is extended or adjusted under 35 U.S.C. 154(b) by 0 days.

(21) Appl. No.: 17/819,508

(22) Filed: Aug. 12, 2022

(65) Prior Publication Data
US 2023/0046575 A1 Feb. 16, 2023

Related U.S. Application Data

(60) Provisional application No. 63/233,029, filed on Aug. 13, 2021.

(51) Int. Cl.
*G05D 7/06* (2006.01)

(52) U.S. Cl.
CPC ......... *G05D 7/0623* (2013.01); *G05D 7/0635* (2013.01); *G05D 7/0676* (2013.01); *Y10T 137/7761* (2015.04)

(58) Field of Classification Search
CPC ............ Y10T 137/7761; G05D 7/0623; G05D 7/0676; G05D 7/0694
USPC ...................................................... 137/487.5
See application file for complete search history.

(56) References Cited

U.S. PATENT DOCUMENTS

| | | | | |
|---|---|---|---|---|
| 5,080,131 | A * | 1/1992 | Ono | G01F 5/00 138/44 |
| 5,661,232 | A * | 8/1997 | Van Cleve | G01N 11/04 73/32 R |
| 5,811,690 | A * | 9/1998 | Hershey | G01P 1/006 73/299 |
| 6,119,710 | A * | 9/2000 | Brown | G01F 1/88 137/486 |
| 2003/0098069 | A1 * | 5/2003 | Sund | G01F 1/8422 137/487.5 |
| 2003/0234048 | A1 * | 12/2003 | Shajii | G01F 5/00 137/487.5 |
| 2008/0140260 | A1 * | 6/2008 | Ding | G05B 13/042 700/282 |
| 2013/0186486 | A1 * | 7/2013 | Ding | G05D 7/0635 137/487 |

(Continued)

FOREIGN PATENT DOCUMENTS

WO WO-2023019257 A1 2/2023

OTHER PUBLICATIONS

"International Application Serial No. PCT US2022 074923, International Search Report dated Nov. 22, 2022", 2 pgs.

(Continued)

*Primary Examiner* — William M McCalister
(74) *Attorney, Agent, or Firm* — Schwegman Lundberg & Woessner, P.A.

(57) ABSTRACT

A fluid system includes a capillary and a first and second temperature sensor, a first and second pressure sensor, and a processor coupled to the sensors. The processor is configured to execute instructions to determine an output using the sensor data and using fluid parameter data received via an interface coupled to the processor. The processor is coupled to a control in fluid communication with the capillary.

18 Claims, 2 Drawing Sheets

(56) References Cited

U.S. PATENT DOCUMENTS

2014/0005957 A1    1/2014  Pihlaja
2014/0229022 A1    8/2014  Deivasigamani et al.
2020/0042021 A1*   2/2020  Somani ................. G01F 1/363

OTHER PUBLICATIONS

"International Application Serial No. PCT US2022 074923, Written Opinion dated Nov. 22, 2022", 7 pgs.

* cited by examiner

20 # DIFFERENTIAL PRESSURE LIQUID FLOW CONTROLLER

CLAIM OF PRIORITY

This patent application claims the benefit of priority of U.S. Provisional Patent Application Ser. No. 63/233,029, filed on Aug. 13, 2021, which is hereby incorporated by reference herein in its entirety.

TECHNICAL FIELD

This document pertains generally, but not by way of limitation, to a liquid flow controller having improved performance.

BACKGROUND

Accurately measuring and controlling flow of a liquid or a gas is critical in many industrial, commercial, and medical applications. For example, semiconductor manufacturing entails fluid handling equipment in which precision is important for device fabrication and performance. A flow controller can provide a fluid path through which the liquid flow rate can be measured or controlled.

Measurement accuracy and control precision can be affected by many factors, including contaminants in the liquid and by irregularities in the fluid path.

SUMMARY

The present subject matter includes a flow controller configured for accurate flow measurement and control. One example compensates for variations in fluid viscosity and density. A relationship can be established between such variables as temperature, pressure, fluid-specific parameters, and fluid flow rate. Measurement sensors can be configured to sense a first set of physical parameters and enable accurate measurement of a second set of physical parameters.

The present inventors have recognized, among other things, that a problem to be solved can include receiving data corresponding to a fluid system and measuring or controlling fluid flow using a flow controller. According to one example, a device can be configured to receive data associated with a temperature of a fluid in a capillary, a differential pressure across the capillary, flow rate information from a flow sensor, and fluid parameter data and based on this data, the device can determine a flow control setting. The flow control setting, when implemented, alters the fluid flow and provides a negative feedback signal by which the device can repeat the data collection and again adjust the control to alter the fluid flow.

According to one example, a device can be configured to receive data associated with a temperature of a fluid in a capillary, a differential pressure across the capillary, and fluid parameter data and based on this data, the device can determine a fluid flow rate through the capillary. The fluid flow rate can be indicated as a mass flow rate or as a volume flow rate.

According to one example, a device can be configured to receive data associated with a temperature of a fluid in a capillary, a differential pressure across the capillary, and a measured fluid flow rate. The measured fluid flow rate can be a volume flow rate or a mass flow rate. In view of the data received, the device can calculate a fluid parameter. The fluid parameter can be correlated with components of the fluid or a selected physical parameter. The fluid parameter can be associated with the fluid density, fluid viscosity or other physical parameter.

According to one example, a device can be configured to receive data associated with a temperature of a fluid in a capillary, a fluid pressure within the capillary, and a measured fluid flow rate. The measured fluid flow rate can be a volume flow rate or a mass flow rate. In addition, the device can receive data associated with physical parameters of the fluid in the capillary. In view of the data received, the device can calculate a differential pressure of the fluid in the capillary. The differential pressure can be associated with a fluid pressure measurement within the capillary at a first axial position within the capillary and a second axial position within the capillary.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
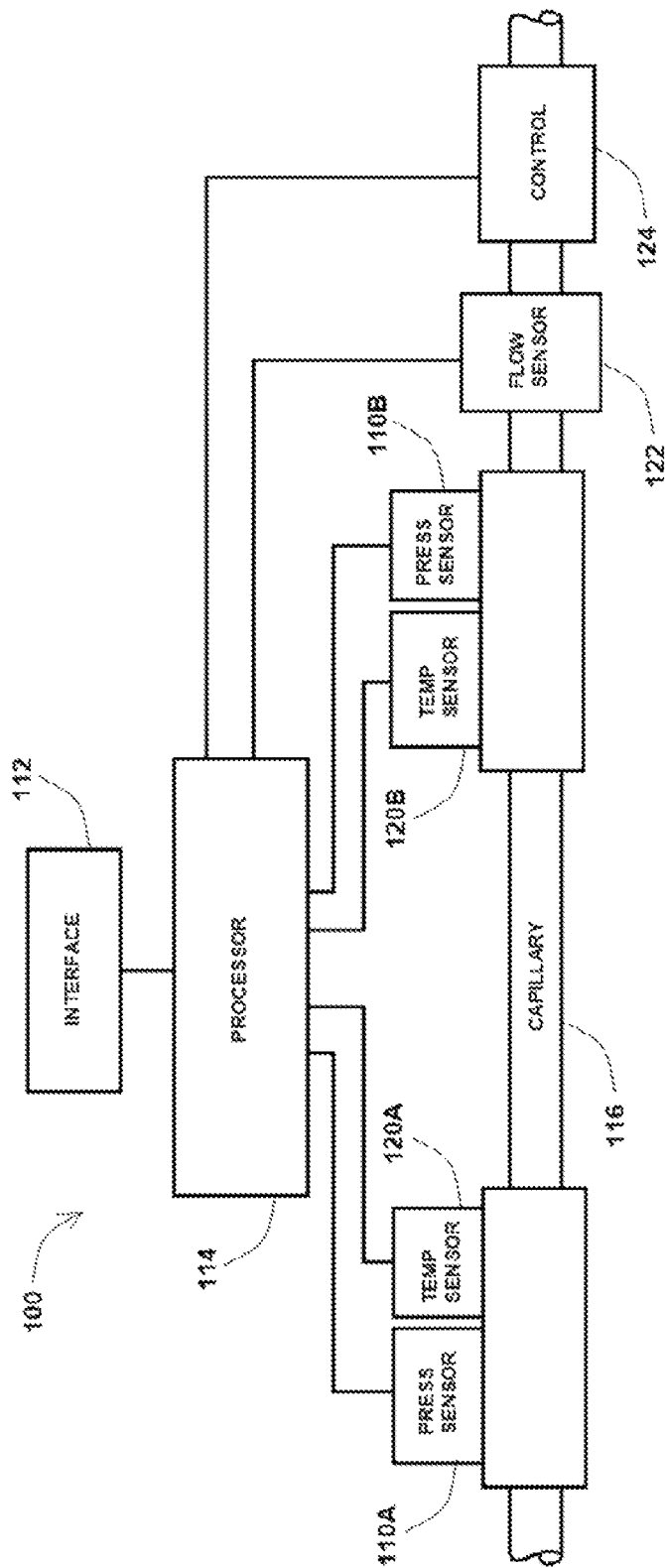
FIG. 1 illustrates a schematic view, according to one example of the present subject matter.

FIG. 1 illustrates a schematic view of system 100, according to one example of the present subject matter. System 100 can be configured into a unitary package, and is sometimes referred to as a device.

System 100 includes capillary 116 having a lumen through which a fluid can flow. Capillary 116, in the example shown, is fitted with pressure sensors 110A and 110B, sometimes referred to as first pressure sensor and second pressure sensor. The fluid flow direction can be left-to-right or right-to-left through capillary 116, in various examples.

Capillary 116, in the example shown, is fitted with temperature sensors 120A and 120B, sometimes referred to as first temperature sensor and second temperature sensor. In the figure, the temperature sensors are coupled to fittings affixed to the ends (first end and second end) of capillary 116. In other examples, a single (rather than double) temperature sensor is provided and disposed at either end or at a position between the ends. The temperature sensor can have a sense surface configured to measure temperature of a capillary wall or the fluid within the capillary.

An output signal from pressure sensors 110A and 110B, and temperature sensors 120A and 120B, are coupled to processor 114. Processor 114 can include an analog or digital computer having instructions or a configuration tailored to implement a method as described herein. Processor 114 is coupled to interface 112. Interface 112 can include a user interface and have a keyboard, a cursor control device (such as a mouse, trackball, or touch-pad), a display, a printer, a microphone or speaker, or other component to allow human interaction with processor 114 or system 100. In one example, interface 112 includes a network interface configured for coupling, through either a wired or wireless connection to remote devices.

In the example shown, processor 114 is coupled to flow sensor 122. Flow sensor 122 can be upstream or downstream of capillary 116. In various examples, flow sensor 122 includes a mass flow sensor or a volume flow sensor. The sensor can provide an output signal accessible to processor 114 in which the signal is a function of the fluid flow through system 100.

In the example shown, processor 114 is coupled to control 124. Control 124 can be upstream or downstream of capillary 116 and can be proximal or distal to capillary 116. In various examples, control 124 includes a valve or pump or other hydraulic component having an adjustable setting. In the case of a pump having a motor drive, control 124 can include a signal line on which processor 114 can set the motor speed, and therefore flow rate through capillary 116. In the figure, control 124 is depicted in series connection with capillary 116, however other configurations are also contemplated. For example, control 124 can include a bypass or shunt fluid path by which flow through capillary 116 can be modulated. The signal line between processor 114 and control 124 can include a set line by which control 124 can be controlled and can include a read line by which processor 114 can receive a signal corresponding to a setting of control 124.

Figure 2:
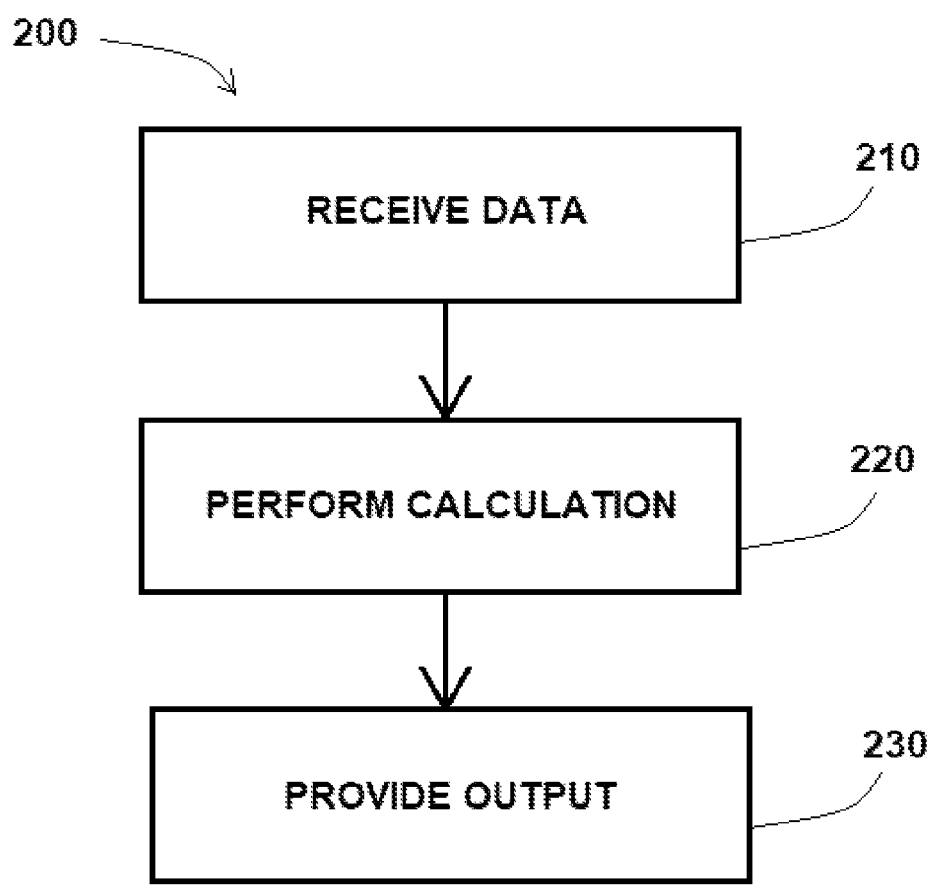
FIG. 2 illustrates a flow chart of a method, according to one example of the present subject matter.

FIG. 2 illustrates a flow chart of method 200, according to one example of the present subject matter. At 210, method 200 includes receiving data. The data can include information concerning temperature from a temperature sensor or pressure from a pressure sensor. In addition, the received data can include fluid flow rate information from a flow sensor or device configuration information from a control device in conjunction with a capillary of a system. In some examples, receiving data can include receiving manually entered information regarding physical parameters of a fluid for use in the system. The data can be received from a user interface or from an interface coupled to a data network or a communication network.

At 220, method 200 includes performing a calculation. The calculation can include executing an algorithm according to stored instructions or programming. The calculation can include determining a temperature, determining a pressure or pressure differential. In other examples, the calculation can include determining a flow rate or generating an output signal corresponding to a flow rate, pressure differential, a temperature, or a physical parameter of a fluid.

At 230, method 200 includes providing the output. Providing an output can include generating a human-perceivable signal such as displaying a value or parameter. In various examples, generating an output includes generating a signal configured to operate a control device in the fluid path. The signal, for example, can control a fluid flow rate or fluid pressure or another parameter.

In Poiseuille flow, liquid moves under the force of a pressure gradient. The gradient can be represented by a differential pressure. The differential pressure is the pressure difference found at an entrance and at an exit of a pipe, or capillary. The differential pressure is a function of the fluid viscosity, the volumetric flow rate, and parameters defining the pipe. Fluid viscosity, in turn, is a function of temperature, whereby increasing temperature reduces viscosity.

The Poiseuille equation is satisfied provided that the fluid flow is laminar rather than turbulent. Laminar flow is associated with a fluid flow below a critical Reynolds number (Re).

As the flow rate increases, the Reynolds number will increase to reach a critical value, beyond which laminar flow will change to transition flow and then turbulent flow. Since the Reynolds number is inversely proportional to viscosity and viscosity decreases as temperature increases, it is expected that such a change will occur at a lower flow rate when the liquid temperature is higher. Experimental tests can determine the threshold flow rate and the associated critical Reynolds number at different temperatures.

Fluid flow can be expressed graphically in a depiction of a Q-ΔP curve in which fluid flow and differential pressure are plotted.

Theoretical flow and measured flow can differ, and instrumentation can be calibrated to provide accurate measures. In some instances, errors in flow rate can be related to viscosity and differences between theory and measurement. Since viscosity is a function of temperature, an accurate temperature measurement provides an accurate measure of flow.

Temperature can be measured directly or indirectly. In measuring temperature directly, a sense surface of a temperature sensor is in contact with the liquid under measurement. In measuring temperature indirectly, the sense surface of a temperature sensor is affixed to measure a wall temperature of a liquid flow tube.

Indirect measurement can avoid complications arising from directly contacting the liquid under test. For example, concern for contaminants can make a direct measurement undesirable or impossible.

One example of the present subject matter includes directly measuring the liquid temperature in the development. One example is configured to measure the liquid tube temperature and improve the method to get better flow calculation.

One example of the present subject matter is directed to achieving a better understanding of the relationship between flow measurement and temperature. For example, an accurate temperature measurement can enlarge the operational range of a liquid flow controller.

Liquid temperatures can be directly measured at an inlet, at an outlet, or both the inlet and outlet of a liquid flow controller (LFC). In addition, a LFC body temperatures can be measured before and after the capillary.

One example considers viscosity of temperature effect on Q deltP DP LFC. Q-deltP refers to mass flow rate differential pressure.

One example includes a configuration for liquid temperatures directly measured before and after the flow resistor and the body temperature was also measured.

One example includes a configuration for liquid temperatures directly to evaluate actual temperature vs body temperature has an effect on the test.

In various examples of the present subject matter, temperature is associated with a measurement at the site of a single temperature sensor or at the site of multiple temperature sensors. A temperature sensor can be affixed to the capillary wall and provide a signal associated with the fluid temperature. The sensor site can be at an axial position along the length of the capillary, and in various examples, the sensor site is at an end or between the ends. In some examples, the temperature sensor has a sense surface in physical contact with the fluid in the capillary.

The following equations can help in characterizing the fluid in the capillary.

$$\frac{\Delta p}{L} = \frac{128}{\pi} \frac{\mu Q_V}{D^4} \left( \text{Re} = \frac{\rho V D}{\mu} < 2000 \right).$$

$$\mu_{act.} = f(T) = Ae^{B/T}.$$

This expresses a relationship between temperature (B) and viscosity p as a function of constants A and B.

Theoretical flow rate conversion from calibration.

$$Q_m = \rho Q_v.$$

This expresses a relationship between mass flow (mass per unit time) and volumetric flow (volume per unit time) in which p represents density (mass per unit volume).

$$Q_m = f(\Delta P) * \left( \frac{\rho_{act.}}{\rho_{std.}} \right) * \left( \frac{\mu_{std.}}{\mu_{act.}} \right).$$

This equation states that mass flow is a function of a differential pressure (over a capillary) and a product of the ratio of actual and standard density and product of the ratio of standard and actual viscosity.

It will be noted that there is relationship between certain of the various parameters. For example, viscosity is a fluid parameter which is affected by temperature. In addition, a differential pressure and temperature are related.

The onset of transition flow and turbulent flow can be seen at different temperatures. In some instances, the critical Re is 2500.

A feature, such as a wall profile or irregularities at an edge, at the capillary entrance can affect the critical Reynolds number. An irregularity can cause disturbance in the entrance flow and thereby reduce the critical Reynolds number. An irregularity can be addressed by removing sharp edges and providing a suitable profile radius at a capillary entrance. In one example, a filter can be positioned upstream of the capillary entrance to catch particles and debris. The filter, however, can be positioned far away enough not to cause disturbance by itself.

Consider the accuracy of the flow calculation across the operating range of the LFC using the temperature compensation method that utilizes the following calculations for density and viscosity adjustments. In the following equations, variables A, B, and C are determined by physical dimensions of the system, here associated with the capillary.

$$\text{Viscosity}: \eta = e^{A + \frac{B}{C+T}}$$

Density:

$$\rho = \frac{A}{B^{1 + \left(1 - \frac{T}{C}\right)^D}}$$

Deformation of the inside diameter of the capillary may be noted when the tubing is configured spiraled.

In one example, computational fluid dynamic (CFD) modelling can be applied to the flow path at selected location—for example, CFD modelling can be conducted downstream of the second pressure sensor to check for turbulence in the flow.

A ferrule seal can be provided by a commercially available ferrule (such as that provided by VICI-Valco).

One example of the disclosed subject matter can be configured for use with a variety of liquids, including TEOS (tetraethyl orthosilicate or tetraethoxysilane), water, isopropyl alcohol, methanol, solvents, petroleum products, polymers, and biological fluids.

In one example, a temperature can be controlled based on an output signal provided by a processor. For example, the temperature of the capillary, a temperature at an inlet end, or a temperature at an outlet end of the capillary.

Analysis of Q v $\Delta P$ may reveal a difference if downstream liquid flow is coupled to a vacuum rather than vented to atmosphere.

In one configuration, the capillary tube is insulated.

In one configuration, a syringe (plastic or non-plastic) is used to determine the response time.

A vacuum pump can be configured to draw air and bleed bubbles. Bubbles in the line may affect the response time.

In one example, bubbles are introduced to the system and the effect on the response time is measured. For example, if bubbles are present in the capillary, then changes can be monitored.

Flow rate is a function of temperature $$Q = f(\Delta P) \cdot (\mu_{std}/\mu_{act})$$

$$Q_1 = f(\Delta P) \cdot (\mu_{std}/\mu_{act})$$

$$Q_2 = f(\Delta P) \cdot (\mu_{std}/(\mu_{act} + \Delta))$$

$$Q_1/Q_2 = (\mu_{act} + \Delta)/\mu_{act} = 1 + \Delta/\mu_{act}$$

If $\mu_{act} = 1$ and $\Delta = 0.01$, then $Q_1/Q_2 = 1 \pm 0.01$

If $\mu_{act} = 0.8$ and $\Delta = 0.01$, then $Q_1/Q_2 = 1 \pm 0.02$

In one example of the present subject matter, a device is configured to operate a component fluidly coupled in series with the capillary. The component can be positioned in the fluid path upstream or downstream of the capillary. In addition, the component can be coupled in a parallel path with the capillary.

The component, sometimes referred to as a control, can be a component that allows for managing fluid flow through the capillary. The component can be a fluid pump for pressurizing the fluid. The pump can be a vane pump, a diaphragm pump, a piston pump, or other type of mechanical pump. In one example, the pump is driven by a motor in which the motor speed determines the pump flow rate or pump pressure, and the motor speed is determined by a signal from the processor. In various examples, the control includes a pump having a variable pressure setting or a bypass channel and the signal delivered to the control allows for variations in the pump performance. In one example, the control includes a valve. The valve can be controlled by a signal from the processor. In one example, the control includes a variable orifice and the signal from the processor can be configured to adjust or select a dimension of the orifice.

In one example, the control includes a thermal device. As such, the output signal from the processor can be configured to increase, or decrease, thermal energy delivered to the device.

In this example, the first temperature sensor and the second temperature sensor are each coupled to respective ends of the capillary. In addition, the first pressure sensor and the second pressure sensor are also coupled to respective ends of the capillary.

The interface can include a user-operable data entry device. Examples of an interface can include a cursor control device (such as a mouse, trackball, touch pad), a keyboard, a touch-screen, a microphone. In addition, various instances of the interface can include a printer and a display screen. In one example, the interface includes a network interface configured to communicate data and instructions via a wired or wireless connection with a communication or data network.

In one example, the interface allows for entry of fluid parameters. The fluid parameters can include physical parameters includes fluid viscosity, fluid density, fluid composition (including contaminants, particles, other components).

In one example, a flow rate sensor is coupled to the capillary. The flow rate sensor can include a mass flow sensor, such as a Coriolis sensor. In various examples the flow rate sensor can include a mechanical-based sensor (such as a turbine flowmeter), a pressure-based sensor (such as a pitot tube), a variable-area flowmeter, an optical flowmeter, an open-channel flow meter, a thermal mass flowmeter, a vortex flowmeter, a sonar flow meter, an electromagnetic flow meter, an ultrasonic flow meter, and an optical flowmeter. The flow rate sensor can provide a signal to the processor.

In one example, the processor executes an algorithm for receiving the sensor data (temperature, pressure, flow rate) and receiving data characterizing the fluid parameters. Based on the received data, the processor provides an output signal to the control. The output signal can be tailored to achieve a particular flow rate or establish a particular temperature, pressure, or pressure differential associated with the capillary.

In one example, the processor executes an algorithm for receiving the sensor data (temperature and pressure) and receiving data characterizing the fluid parameters. The control element can be omitted or can be operated at a fixed setting. Based on the received data, the processor provides an output signal to determine a flow rate. The output signal can be tailored to provide accurate flow rate based on the received data concerning temperature and differential pressure associated with the capillary. The flow rate can be indicated by a visible indication.

In one example, the processor executes an algorithm for receiving the sensor data (temperature, pressure, and flow rate). Based on the received data, and when configured with a fixed or non-adjustable control element associated with the capillary, the processor provides an output signal corresponding to selected fluid parameters. The output signal can be tailored to provide data indicating fluid viscosity, fluid density, particle count, or another parameter. In one example, the output signal can be used for fluid identification or fluid matching.

In one example, the processor executes an algorithm for receiving temperature sensor data, pressure sensor data and flow rate and receiving data characterizing the fluid parameters. The pressure sensor data can be associated with a sensor at a first end of the capillary, a second end of the capillary, or some other pressure data. Based on the received data, and when configured with a fixed or non-adjustable control element associated with the capillary, the processor provides an output signal corresponding to a differential pressure. The output signal can correlate with a differential pressure relative to the one sensed pressure data received by the processor.

In one example, the processor executes an algorithm for receiving temperature sensor data, differential pressure sensor data and flow rate and receiving data characterizing the fluid parameters. The temperature sensor data can be associated with a sensor at a first end of the capillary, a second end of the capillary, or some other temperature data. Based on the received data, and when configured with a fixed or non-adjustable control element associated with the capillary, the processor provides an output signal corresponding to a temperature.

One objective includes measuring liquid temperature and liquid flow rates. This may apply to high flow rates and to low flow rates. Various approaches can be used to measure liquid temperature. Also consider some of the costs associated with direct measurement of liquid temperature. A relationship can be noted between flow measurement and temperature. Accurate temperature measurement can enlarge the operational range for flow measurement. One aspect of interest concerns the flow which drives the temperature profile.

An aspect of the present subject matter concerns measuring or controlling a differential pressure to control the flow. Fluid flow is affected by many factors, including various physical parameters of the fluid (such as viscosity, particle content, and density) and fluid temperature. In one example of the present subject matter, a control component is configured to manage the fluid flow. The control component can include a pump, a valve, a reservoir, or other device which affects the fluid flow. In one example, an algorithm is executed by a processor to provide flow control or control a device in fluid communication with the capillary or provide a measure of a calculated value.

In one example, the present subject matter includes a device calibrated at a first temperature and thereafter operated at another temperature. An example of the present subject matter provides interrelationships to allow calibration curves to be generated under standard conditions and non-standard conditions.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A fluid system comprising:
a capillary having a first end and a second end;
a first temperature sensor coupled to the capillary;
a first pressure sensor disposed at the first end;
a second pressure sensor disposed at the second end;
a processor coupled to the first temperature sensor, the first pressure sensor, and the second pressure sensor, wherein the processor is configured to execute instructions to determine an output using
a first temperature based on the first temperature sensor,
a first pressure based on the first pressure sensor,
a second pressure based on the second pressure sensor, and
a fluid parameter, the fluid parameter received using an interface coupled to the processor, and
wherein the processor is coupled to a control in fluid communication with the capillary.

2. The fluid system of claim 1 wherein the control includes at least one of a valve, a pump, and an orifice.

3. The fluid system of claim 1 wherein the interface includes a user-operable data entry device.

4. The fluid system of claim 1 wherein the interface includes a coupling to a network.

5. The fluid system of claim 1 further including a flow sensor coupled to the processor and fluidly coupled to the capillary.

6. The fluid system of claim 5 wherein the flow sensor includes a mass flow sensor.

7. A fluid system comprising:
a capillary having a first end and a second end;
a first temperature sensor coupled to the capillary;
a first pressure sensor disposed at the first end;
a second pressure sensor disposed at the second end;
a processor coupled to the first temperature sensor, the first pressure sensor, and the second pressure sensor, wherein the processor is configured to execute instructions to determine an output using
a first temperature based on the first temperature sensor,
a first pressure based on the first pressure sensor,
a second pressure based on the second pressure sensor, and
a fluid parameter, the fluid parameter received using an interface coupled to the processor, and
wherein the output corresponds to a measure of mass flow rate within the capillary.

8. The fluid system of claim 7 wherein the processor is coupled to a display configured to provide a visible indication of the output.

9. The fluid system of claim 7 wherein the interface includes a user-operable data entry device.

10. The fluid system of claim 7 wherein the interface includes a coupling to a network.

11. A fluid system comprising:
a capillary having a first end and a second end;
a first temperature sensor coupled to the capillary;
a first pressure sensor disposed at the first end;
a second pressure sensor disposed at the second end;
a processor coupled to the first temperature sensor, the first pressure sensor, and the second pressure sensor, wherein the processor is configured to execute instructions to determine an output using
a first temperature based on the first temperature sensor,
a first pressure based on the first pressure sensor,
a second pressure based on the second pressure sensor, and
a flow rate based on a flow sensor coupled to the capillary, and
wherein the output corresponds to a parameter of a fluid in the capillary.

12. The fluid system of claim 11 wherein the flow sensor includes a mass flow sensor.

13. The fluid system of claim 11 wherein the processor is coupled to a display configured to provide a visible indication of the output.

14. A fluid system comprising:
a capillary having a first end and a second end;
a first temperature sensor coupled to the capillary at the first end;

a second temperature sensor coupled to the capillary at the second end;

a first pressure sensor disposed at the first end;

a processor coupled to the first temperature sensor, the first pressure sensor and, and the second temperature sensor, wherein the processor is configured to execute instructions to determine an output using a first temperature based on the first temperature sensor, a first pressure based on the first pressure sensor, and a fluid parameter, the fluid parameter received using an interface coupled to the processor, and a flow rate, the flow rate received from a flow sensor in fluid communication with the capillary, and wherein the output corresponds a differential pressure associated with the first pressure.

15. The fluid system of claim 14 wherein the interface includes a user-operable data entry device.

16. The fluid system of claim 14 wherein the interface includes a coupling to a network.

17. The fluid system of claim 14 wherein the flow sensor includes a mass flow rate sensor.

18. The fluid system of claim 14 wherein the flow sensor includes a volume flow rate sensor.

\* \* \* \* \*